United States Patent
Gutfleisch et al.

(10) Patent No.: US 7,739,670 B2
(45) Date of Patent: Jun. 15, 2010

(54) SYSTEM AND METHOD FOR TRANSFORMING INFORMATION BETWEEN DATA FORMATS

(75) Inventors: Michael Roman Gutfleisch, Wiesloch (DE); Andreas Heinzmann, Weinheim (DE)

(73) Assignee: SAP AG, Walldorf (DE)

( * ) Notice: Subject to any disclaimer, the term of this patent is extended or adjusted under 35 U.S.C. 154(b) by 1157 days.

(21) Appl. No.: 10/942,026

(22) Filed: Sep. 16, 2004

(65) Prior Publication Data
US 2006/0059115 A1 Mar. 16, 2006

(51) Int. Cl.
G06F 9/45 (2006.01)
(52) U.S. Cl. ..................... 717/136; 717/137
(58) Field of Classification Search .......... 717/136, 717/137
See application file for complete search history.

(56) References Cited

U.S. PATENT DOCUMENTS

| | | | | |
|---|---|---|---|---|
| 6,148,335 A * | 11/2000 | Haggard et al. | ............. | 709/224 |
| 6,504,554 B1 * | 1/2003 | Stone et al. | .................. | 715/760 |
| 6,560,769 B1 * | 5/2003 | Moore et al. | ................. | 717/100 |
| 6,701,517 B1 * | 3/2004 | Moore et al. | ................. | 717/121 |
| 7,124,413 B1 * | 10/2006 | Klemm et al. | .............. | 719/313 |
| 7,363,593 B1 * | 4/2008 | Loyens et al. | ................ | 715/853 |
| 2002/0023261 A1 * | 2/2002 | Goodwin et al. | ............ | 717/146 |
| 2003/0014421 A1 * | 1/2003 | Jung | ........................... | 707/102 |
| 2003/0067481 A1 * | 4/2003 | Chedgey et al. | ............. | 345/738 |
| 2003/0149934 A1 * | 8/2003 | Worden | ...................... | 715/513 |
| 2004/0015834 A1 * | 1/2004 | Mestre et al. | ............... | 717/106 |
| 2004/0083479 A1 * | 4/2004 | Bondarenko et al. | ........ | 719/310 |
| 2004/0098407 A1 * | 5/2004 | Westendorf et al. | ...... | 707/103 Y |
| 2004/0230605 A1 * | 11/2004 | Tamboli et al. | ............. | 707/102 |

* cited by examiner

*Primary Examiner*—Wei Y Zhen
*Assistant Examiner*—Matthew J Brophy
(74) *Attorney, Agent, or Firm*—Kenyon & Kenyon LLP

(57) ABSTRACT

A method and system for transforming information between data formats. According to one embodiment, a transformation engine receives an indication of an input data format and an output data format, identifies, based on the input data format, an input transformation program from a set of input transformation programs, each program in the set of input transformation programs configured to transform information arranged according to a distinct data format to a standard format, utilizes the identified input transformation program to transform an information source arranged according to the input data format to the standard format, identifies, based on the output data format, an output transformation program from a set of output transformation programs, each program in the set of output transformation programs configured to transform information arranged according to the standard format to a distinct data format, and utilizes the identified output transformation program to transform the information source arranged according to the standard format to the output data format.

36 Claims, 16 Drawing Sheets

SYSTEM AND METHOD FOR TRANSFORMING INFORMATION BETWEEN DATA FORMATS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

In today's complex software environment, information may be represented in a myriad of different formats, each of which define a particular arrangement of data that can be processed and/or stored by a computer. For example, a letter may be represented by a format defined by a particular word processing application, such as Microsoft Word or WordPerfect; an image may represented by one of the many available graphics formats such as JPG and BMP; a song may represented by one of the many available digital audio formats such as music CD, MP3, WAV and AIFF; a video may represented by one of the many available digital video formats such as MPEG and DVD.

Even information pertaining to source code may be represented in different formats. For example, computer programming class information may be represented in a class file or database table format defined by a particular programming language, such as Java or ABAP, respectively, and it may also be represented in a standard format such as UML ("Unified Modeling Language"), which is provided by the Object Management Group and describes object-oriented systems. This standard UML format may be implemented through software such as IBM's Rational software (better known as "Rational Rose"), which stores UML model information in ".mdl" files.

Given the growing complexity of software development, it is not unusual for several components of a software application to be developed in different languages and runtime environments. Because of this complexity, it has become useful for developers to create tools that directly transform information pertaining to the software application between different formats, such as transforming class information to ".mdl" UML model files and HTML documentation.

However, existing transformation programs contain a lot of duplicate code and transformation knowledge, which leads to great redundancy and difficulty when enhancing or maintaining such programs. Further, some transformation programs do not exist for desired transformations between particular source and destination formats. With each additional format to be supported, the number or permutations of new transformation programs to be created increases dramatically. Mathematically speaking, if there are n source formats and m destination formats, n*m transformation programs would have to be implemented and maintained. Given the growing number of different formats in use today and being created, the current state of enhancing and maintaining such transformation programs can clearly hinder the application development process.

Accordingly, there is a need in the art for an improved system and method for transforming information between data formats.

DETAILED DESCRIPTION

Instead of implementing direct peer to peer transformation programs for each source-destination format combination, embodiments of the present invention implement input transformation programs, or "readers," to transform information arranged according to each respective source format to an standard format, along with output transformation programs, or "writers," to transform the information arranged according to the standard format to each destination format. In this manner, instead of implementing n*m direct transformation programs for each additional format to be supported (as explained above), only n+m transformation programs would need to be implemented according to the present invention without redundant coding and maintenance, with the n+m programs having the ability to produce any of the n*m transformations.

Figure 1:
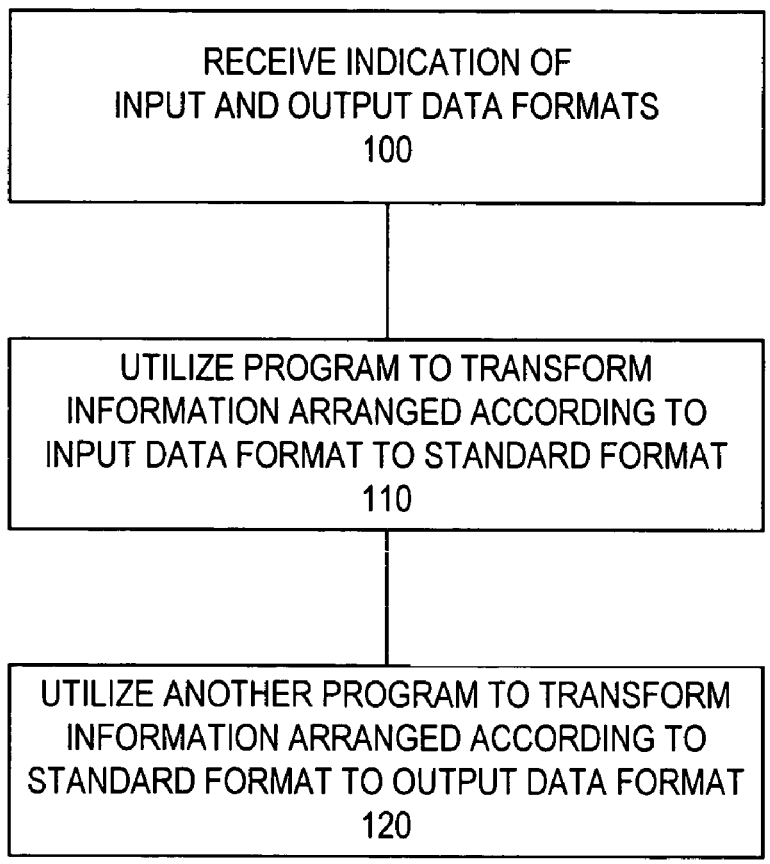
FIG. 1 is a flowchart that depicts a process for transforming information between data formats in accordance with an embodiment of the present invention.

FIG. 1 depicts a process for transforming information between data formats in accordance with an embodiment of the present invention. A transformation engine receives an indication of an input data format and an output data format (step 100), utilizes a program to transform information arranged according to the input data format to a standard format (step 110), and then utilizes another program to transform the information arranged according to the standard format to the output data format (step 120).

Figure 2:
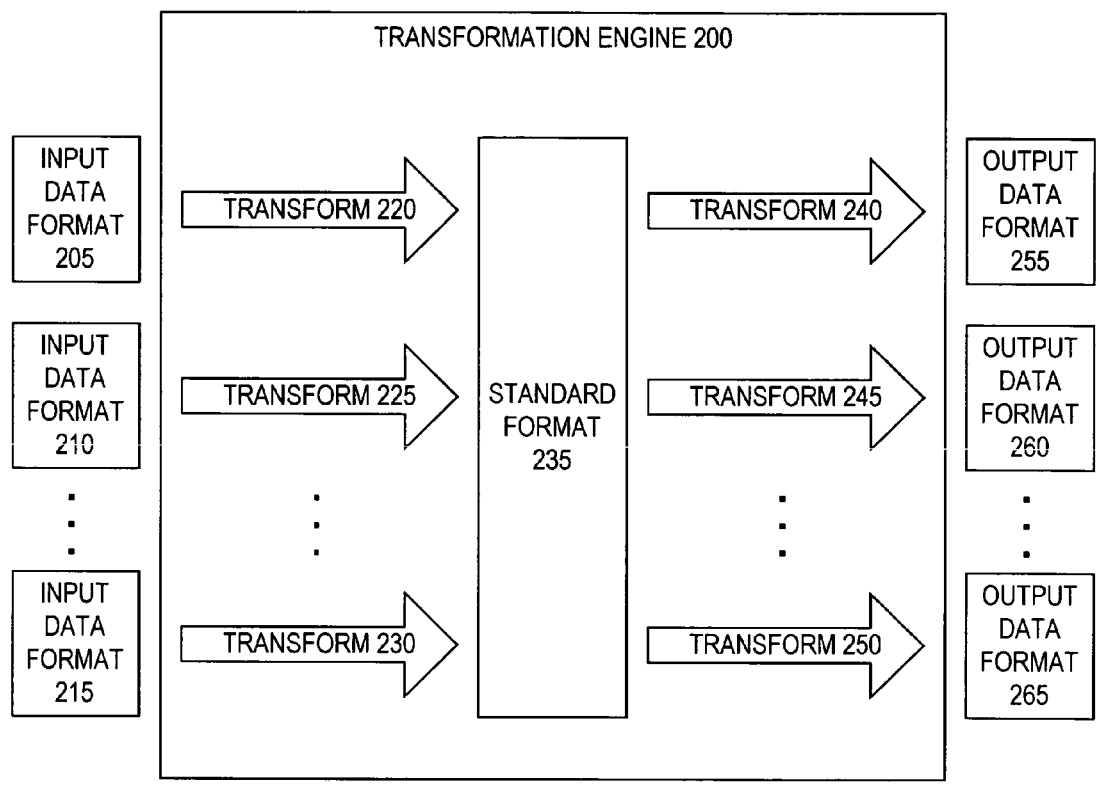
FIG. 2 is a block diagram that depicts the transformation of information between data formats in accordance with an embodiment of the present invention.

As shown in FIG. 2, in one embodiment of the present invention transformation engine 200 receives a selection of one or more input, or source, data formats (e.g., input data formats 205, 210, 215), and a selection of one or more output, or destination, data formats (e.g., output data formats 255, 260, 265). Presuming, by way of example, that a user selects input data format 205 and output data format 265, transformation engine 200 calls the applicable program (transform 220) from the set of readers (transforms 220, 225, 230) to transform information arranged according to input data format 205 to a format (standard format 235) general enough to alternatively represent information arranged according to any of the input or output data formats. Once transform 220 outputs the information in standard format 235, transformation engine 200 calls the other applicable program (transform 250) from the set of writers (transforms 240, 245, 250) to transform the output information (which is currently in standard format 235) to output data format 265.

Embodiments of the present invention may utilize readers and writers to transform information arranged according to any number of formats, as long as the information can also be alternatively represented by a standard format. The standard format may be any format such as, for example, one based on a standard specification that is widely used and accepted, or one that is sanctioned by a standards organizations such as the Object Management Group. Input and output data format information may be received by a transformation engine from a user via a graphical user interface or from another program, for example. A transformation engine may use any method to identify, based on the received input and output data format information, the particular reader or writer to utilize from a set of readers or writers, including utilizing a lookup table or transformation program profile, for example.

UML Embodiment

According to one embodiment, a reader may transform source data formats defining an arrangement of programming class information, such as Java class files or ABAP local and/or global class information which are stored in database tables; a reader may transform source data formats defining an arrangement of function module information, such as ABAP function pools; a reader may transform source data formats defining an arrangement of API ("application programming interface") information, such as ABAP BAPI information; a reader may transform source data formats defining an arrangement of object repository information, such as ABAP BOR ("Business Object Repository") object information; a reader may transform source data formats defining an arrangement of database table information.

Further according to this embodiment, a writer may transform a standard format into destination data formats defining an arrangement of UML information, such as the ".mdl" data format utilized for storing Rational Rose output files; a writer may transform a standard format into destination data formats defining an arrangement of HTML documentation information, such as Javadoc and ABAPdoc output; a writer may transform a standard format into destination data formats based on XMI "XML Metadata Interchange"), which enables easy interchange of metadata between UML based modeling tools and MOF ("Meta Object Facility") based metadata repositories in distributed heterogeneous environments.

Figure 3:
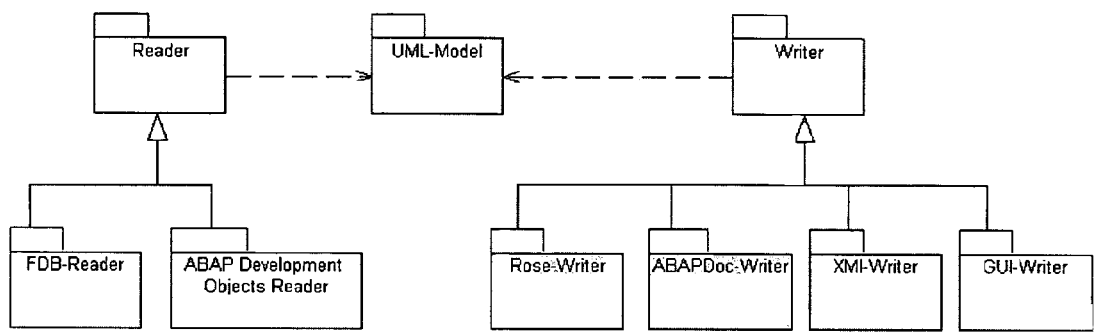
FIG. 3 is a UML diagram that depicts transformation readers and writers in accordance with an embodiment of the present invention.
Figure 4:
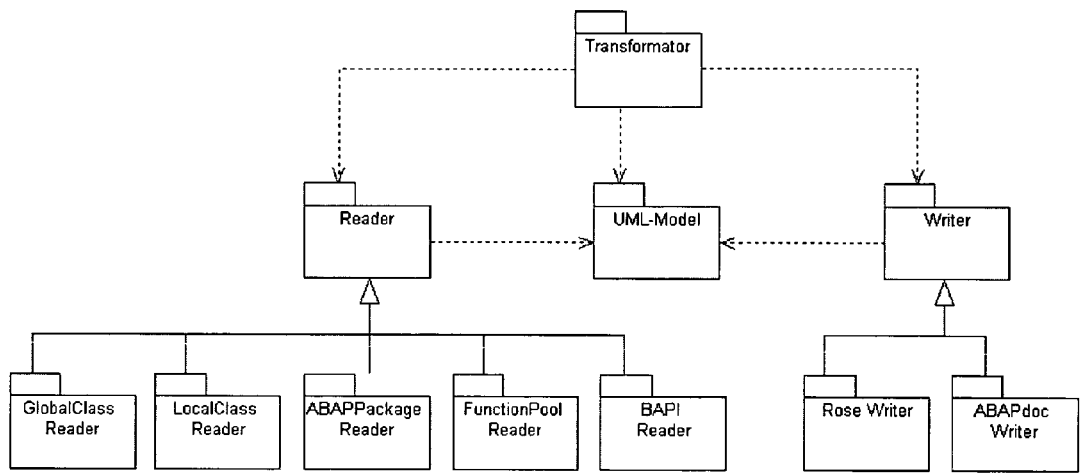
FIG. 4 is a UML diagram that depicts transformation readers and writers in accordance with an embodiment of the present invention.

The standard format (standard format 235) according to this embodiment may be based on UML, since UML can alternatively represent information stored according to any of these listed input or output data formats. FIGS. 3 and 4 depict UML package diagrams representing various types of readers and writers. (The dashed arrows in the diagrams signify that one package uses the other package; the solid arrows signify that one package inherits from the other package).

FIG. 3 illustrates various readers, including the "FDB-Reader" package which represents a collection of model elements constituting a reader that transforms database tables to the standard UML model format, and the "ABAP Development Objects Reader" package which transforms development objects (e.g., function pools, local and global classes, etc.) to the standard UML model format. Various writers are also illustrated, such as the "Rose-Writer" package which represents a collection of model elements constituting a writer that transforms the standard UML model format into Rational Rose output files, the "ABAPDoc-Writer" package which transforms the standard UML model format into ABAPdoc output, the "XMI-Writer" package which transforms the standard UML model format into particular destination data formats based on XMI, and the "GUI-Writer" package which transforms the standard UML model format into a representation of the UML model displayable on via a graphical user interface screen.

FIG. 4 illustrates readers for ABAP global classes ("GlobalClass Reader"), ABAP local classes ("LocalClass Reader"), ABAP development packages ("ABAPPackage Reader") which read everything inside an ABAP development package (such as classes, function pools, business objects, database tables, etc.), ABAP function pools ("FunctionPool Reader"), and ABAP BAPIs ("BAPI Reader"). FIG. 4 illustrates writers for Rational Rose output files ("Rose Writer") and ABAPdoc output ("ABAPdoc Writer"). The "Transformator" package represents the ability to combine several readers and writers to perform one or more transformations.

Figure 5:
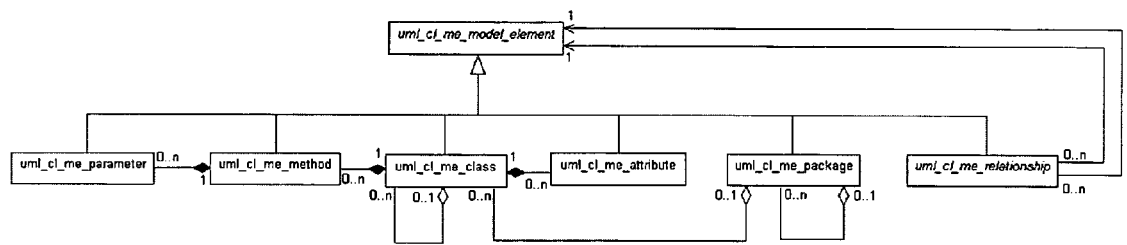
FIG. 5 is a UML diagram that depicts the structure of a UML model element in accordance with an embodiment of the present invention.
Figure 6:
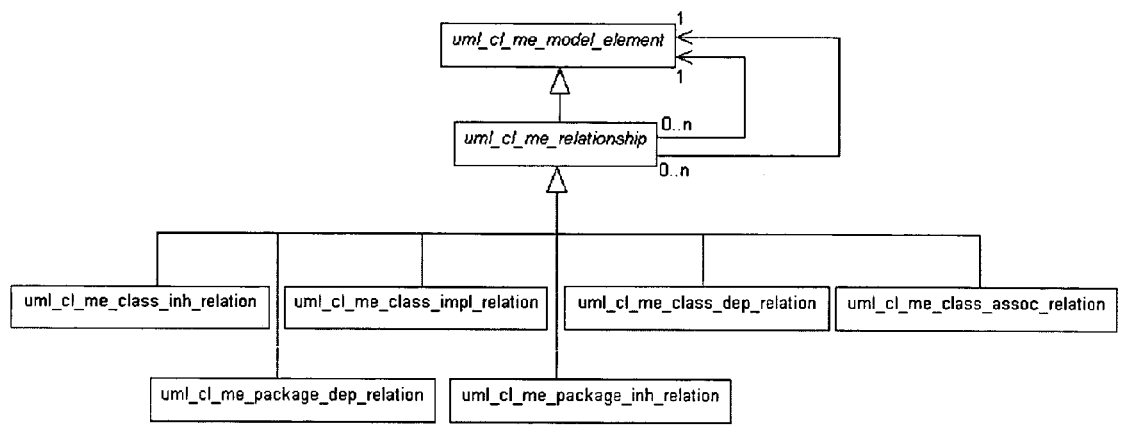
FIG. 6 is a UML diagram that depicts the structure of UML relationships in accordance with an embodiment of the present invention.
Figure 7:
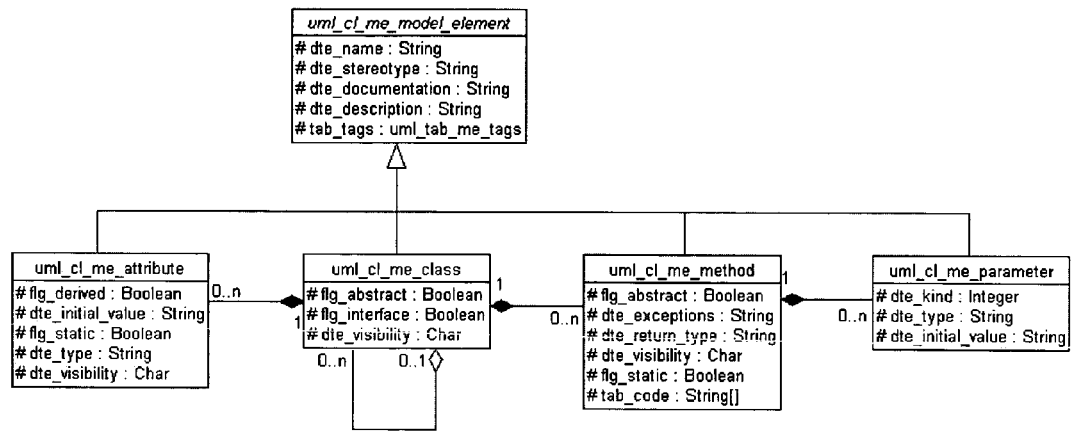
FIG. 7 is a UML diagram that depicts some detailed UML model elements in accordance with an embodiment of the present invention.
Figure 8:
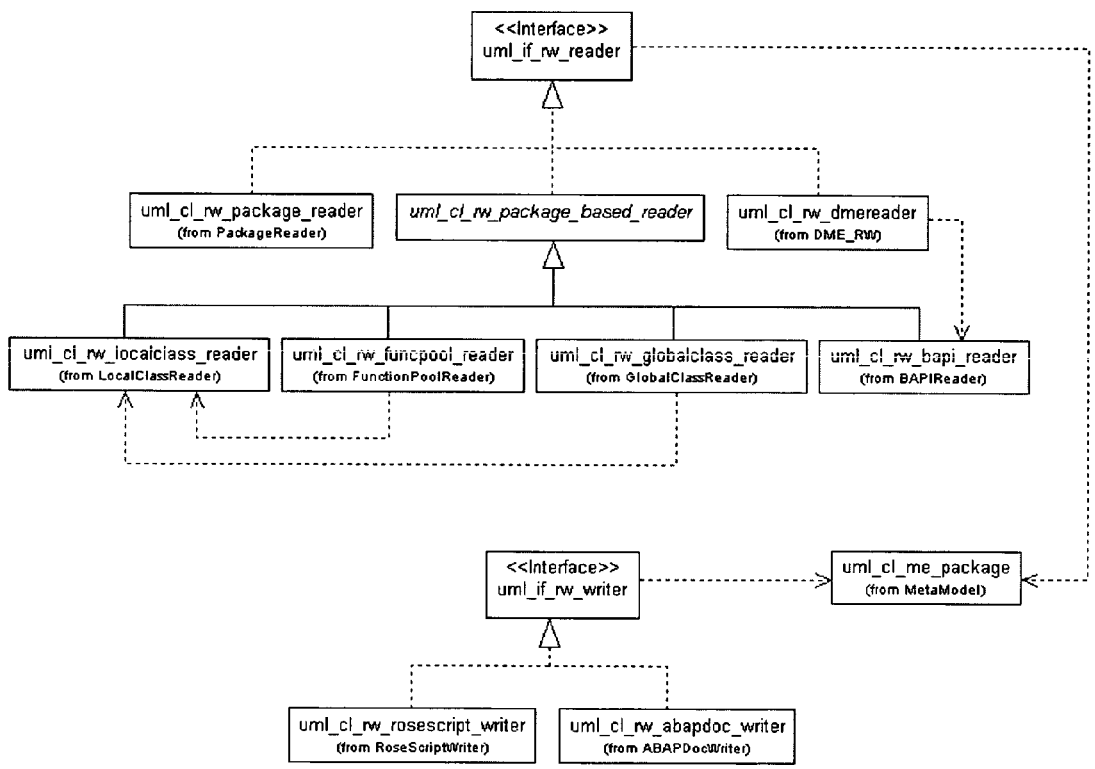
FIG. 8 is a UML diagram that depicts the structure of a package-based readers in accordance with an embodiment of the present invention.

FIG. 5 depicts the structure of a UML model element, and FIG. 6 illustrates the relationship classes in more detail. FIG. 7 depicts the methods and attributes of some detailed UML model elements. FIG. 8 depicts the structure of a package-based reader; package-based readers enable users to easily combine information from different kinds of development objects that are grouped together in development packages (e.g., collections of development objects).

Figure 9:
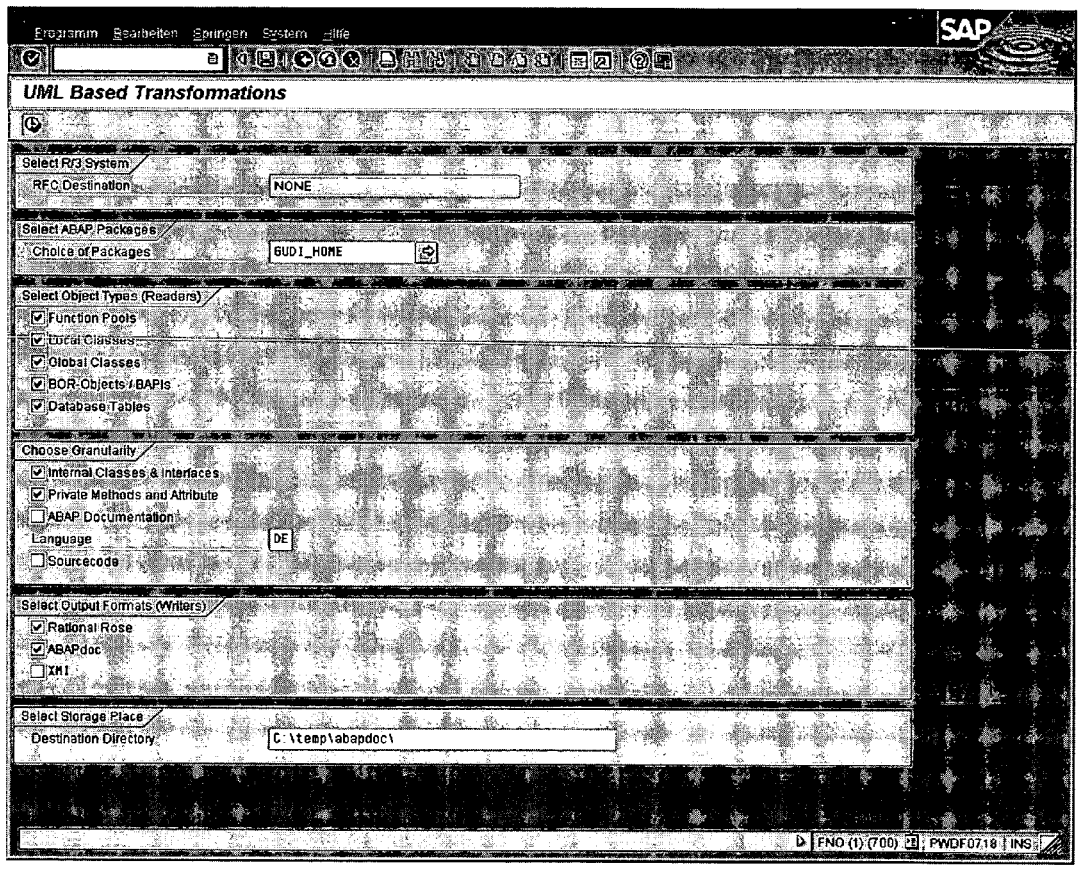
FIG. 9 is a screenshot that depicts a source and destination format selection screen in accordance with an embodiment of the present invention.

FIG. 9 depicts a user interface according to an embodiment of the present invention that enables a user to indicate one or more source and destination formats of objects to be transformed within an ABAP development package. Under the "Select Object Types (Readers)" tab, the user has selected all of the listed readers, and under the "Select Output Formats (Writers)" tab, the user has selected two of the three listed writers. Under the "Select ABAP Packages" tab, the user has identified the ABAP package ("GUDI_HOME") that represents the objects to be transformed by transformation engine 200. The "Select Storage Place" tab enables the user to identify where the transformed output will be stored. The "Choose Granularity" tab enables the user to select the level of detail of the generated output (e.g., one can suppress the display of private methods and attributes).

Figure 10:
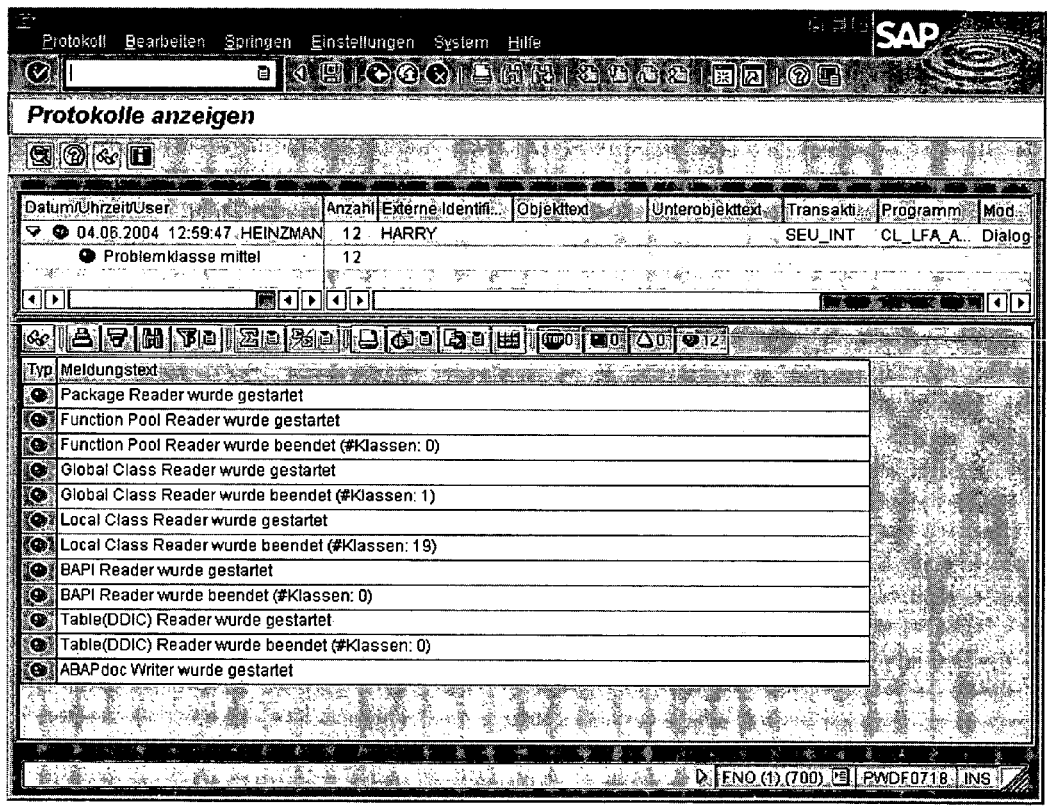
FIG. 10 is a screenshot that depicts a transformation result screen in accordance with an embodiment of the present invention.

As transformation engine 200 completes the transformations, a screen as in FIG. 10 may display message text ("Meldungstext") showing when each reader and writer is started ("wurde gestartet") and completed ("wurde beendet").

Figure 11:
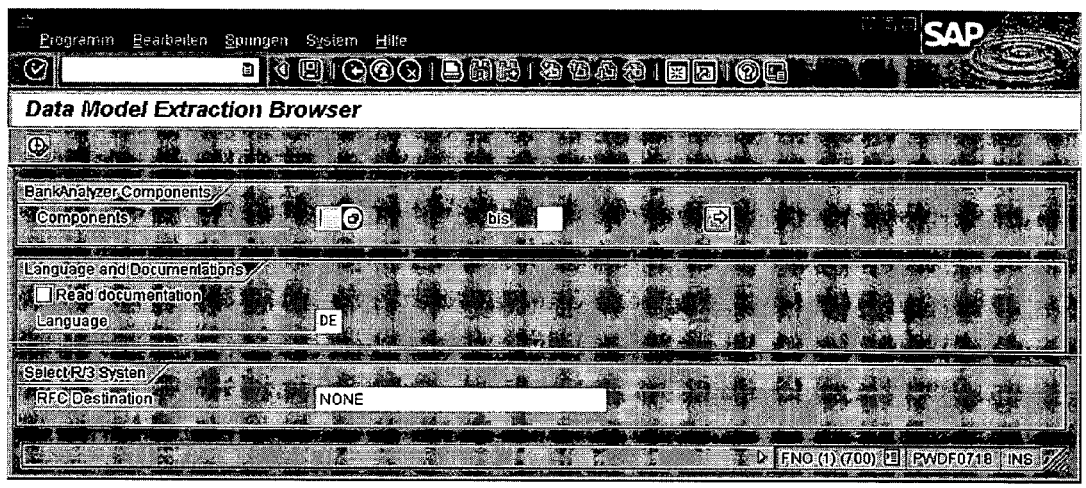
FIG. 11 is a screenshot that depicts a customized selection screen in accordance with an embodiment of the present invention.
Figure 12:
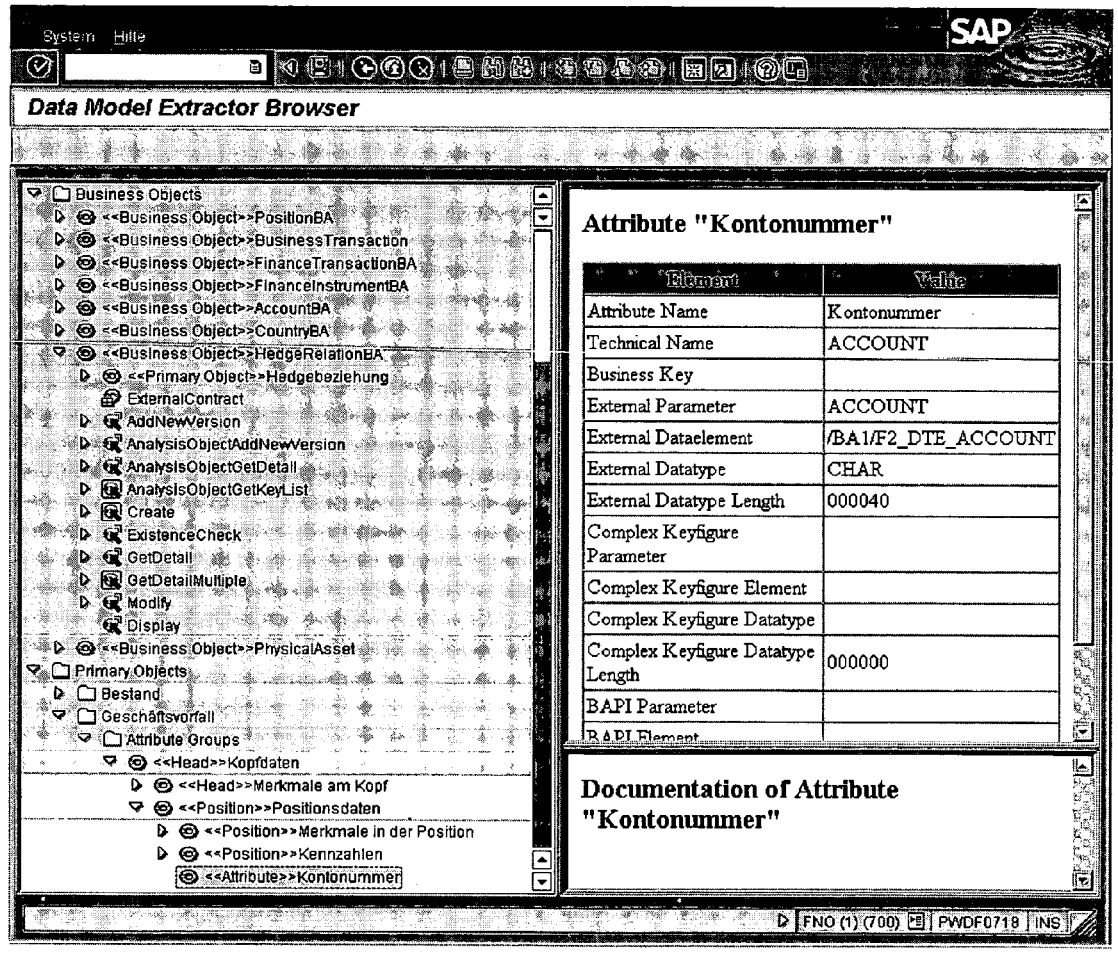
FIG. 12 is a screenshot that depicts a transformation to GUI result screen in accordance with an embodiment of the present invention.

FIG. 11 depicts an application-specific user interface according to an embodiment of the present invention. This user interface enables a user to indicate one or more application components to be displayed based on a UML representation as shown in FIG. 12 (e.g., via the "GUI-Writer"). In this particular embodiment, a user may select various components under the "BankAnalyzer Components" tab to be transformed by a reader to a standard UML format, which will then be transformed to form displayable via a graphical user interface screen. "BankAnalyzer" in this embodiment refers to an SAP Banking platform; "BankAnalyzer Components" may include different types of accounts, financial instruments, countries, positions, business partners, etc.

Figure 13:
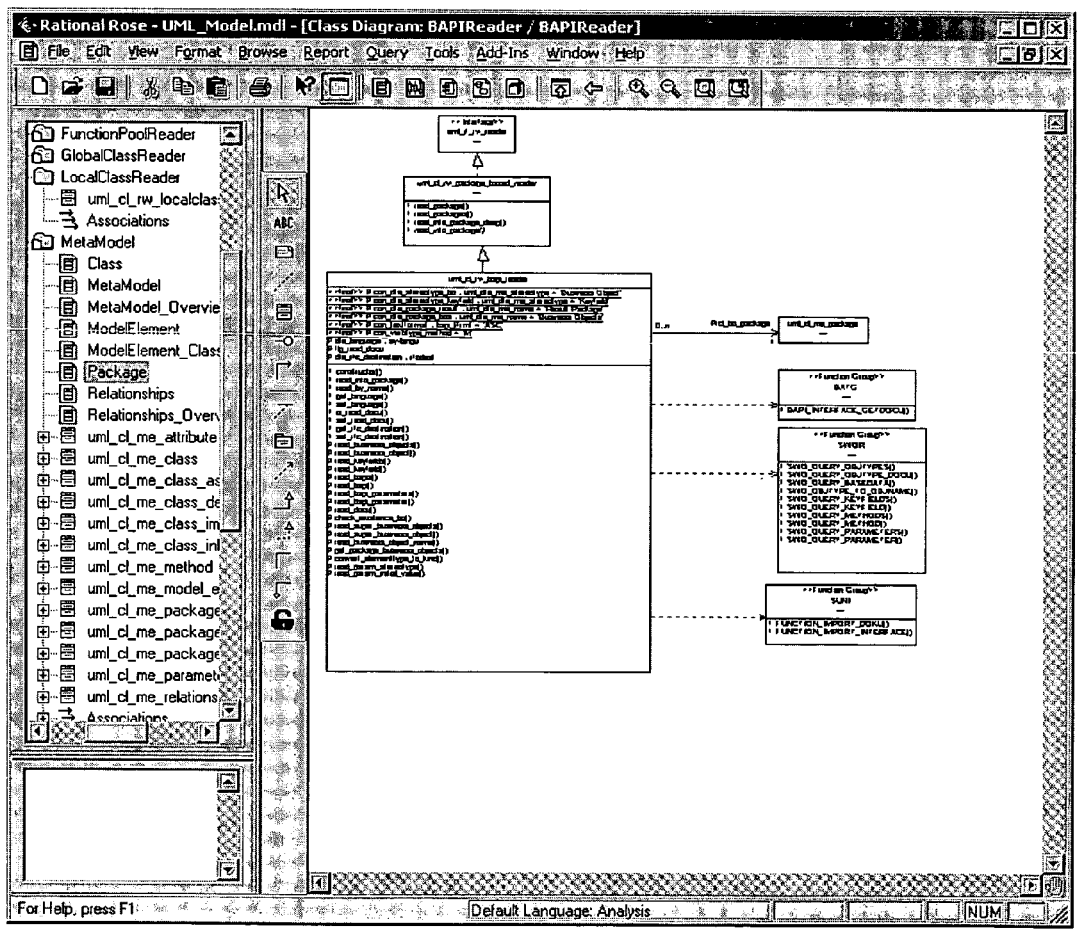
FIG. 13 is a screenshot that depicts a transformation to Rational Rose result screen in accordance with an embodiment of the present invention.
Figure 14:
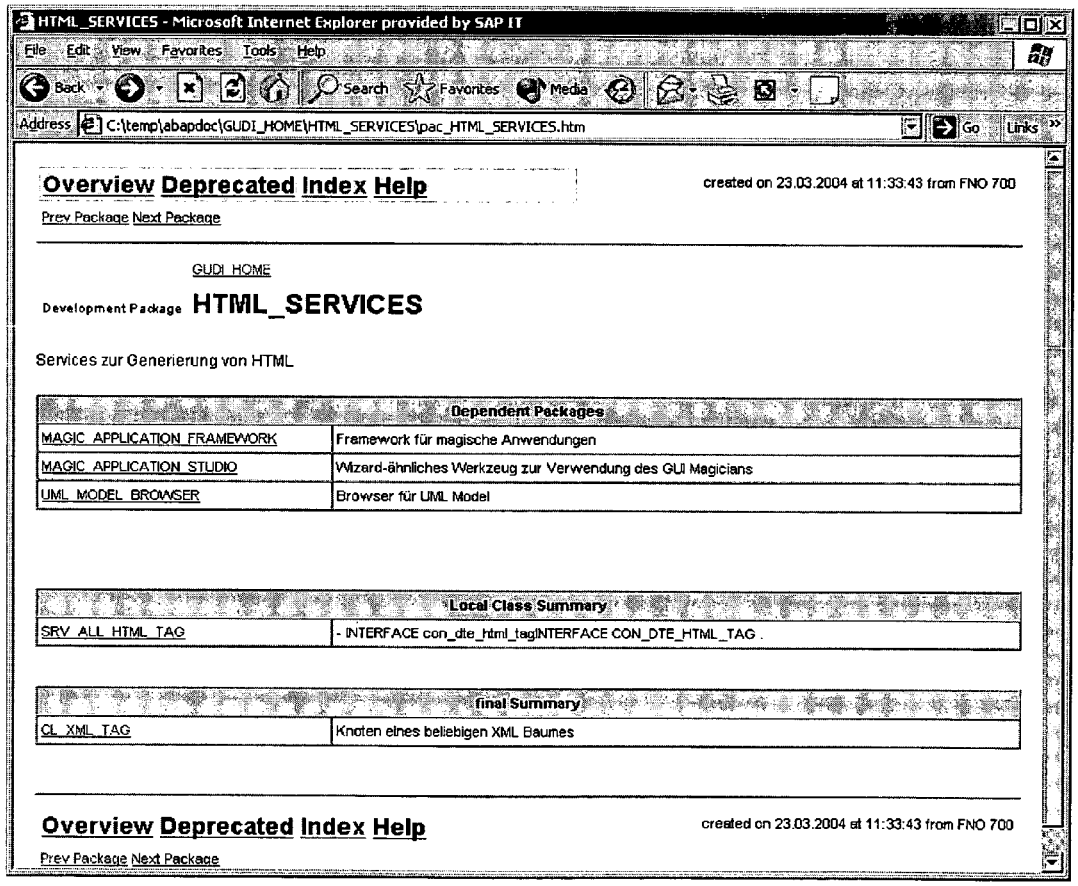
FIG. 14 is a screenshot that depicts a transformation to HTML documentation result screen in accordance with an embodiment of the present invention.

FIG. 13 depicts a resulting transformation to a Rational Rose output file, as shown through a Rational Rose software user interface according to an embodiment of the present invention. FIG. 14 depicts a resulting transformation to ABAPdoc output according to an embodiment of the present invention.

Computer Architecture

Figure 15:
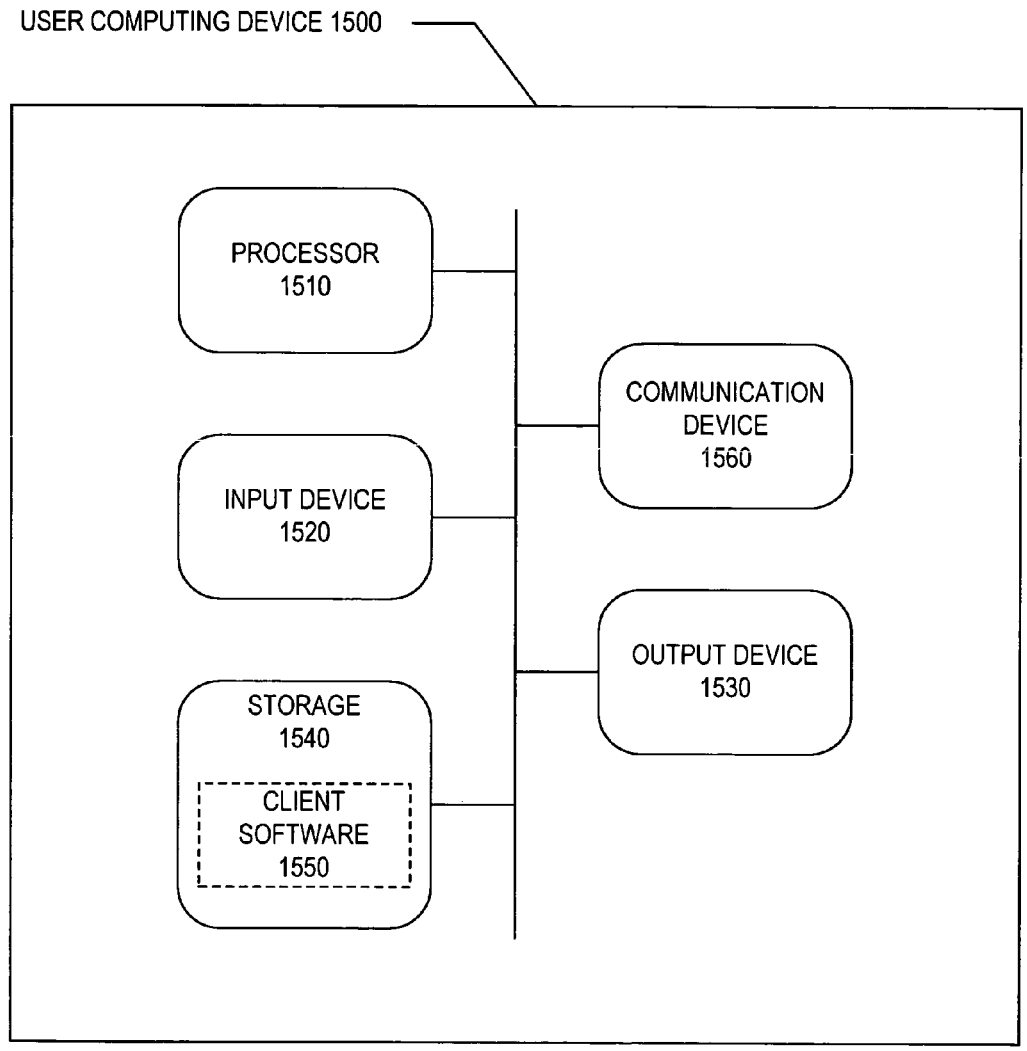
FIG. 15 is a block diagram that depicts a user computing device in accordance with an embodiment of the present invention.
Figure 16:
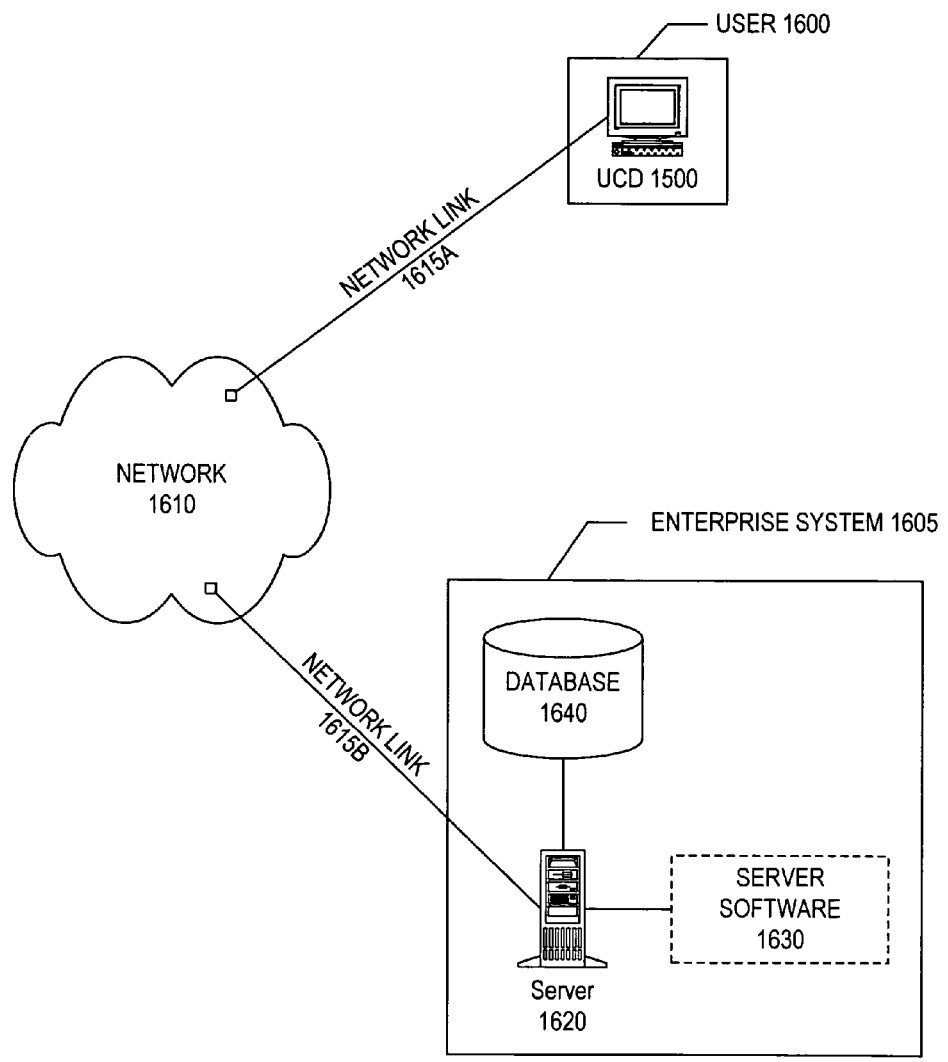
FIG. 16 is a block diagram that depicts a network architecture in accordance with an embodiment of the present invention.

FIGS. 15 and 16 illustrate the components of a basic computer and network architecture in accordance with an embodiment of the present invention. FIG. 15 depicts user computing device 1500, which may be a personal computer, workstation, handheld personal digital assistant ("PDA"), or any other type of microprocessor-based device. User computing device 1500 may include one or more of processor 1510, input device 1520, output device 1530, storage 1540, and communication device 1560.

Input device 1520 may include a keyboard, mouse, pen-operated touch screen or monitor, voice-recognition device, or any other device that provides input. Output device 1530 may include a monitor, printer, disk drive, speakers, or any other device that provides output.

Storage 1540 may include volatile and nonvolatile data storage, including one or more electrical, magnetic or optical memories such as a RAM, cache, hard drive, CD-ROM drive, tape drive or removable storage disk. Communication device 1560 may include a modem, network interface card, or any other device capable of transmitting and receiving signals over a network. The components of user computing device 1500 may be connected via an electrical bus or wirelessly.

Client software 1550, which may be stored in storage 1540 and executed by processor 1510, may include, for example, the client side of a client/server application that embodies the functionality of the present invention (e.g., transformation engine 200).

FIG. 16 illustrates a network architecture in accordance with an embodiment of the present invention. According to one particular embodiment, when user 1600 invokes a client/server application hosted by Enterprise System 1605, client software 1550 of user computing device 1500 communicates with server software 1630 (e.g., the server side of the client/server application) of server 1620 via a network link 1615a, network 1610, and network link 1615b.

Network links 1615 may include telephone lines, DSL, cable networks, T1 or T3 lines, wireless network connections, or any other arrangement that implements the transmission and reception of network signals. Network 1610 may include any type of interconnected communication system, which may implement any communications protocol, which may be secured by any security protocol.

Server 1620 includes a processor and memory for executing program instructions as well as a network interface, and may include a collection of servers. In one particular embodiment, server 1620 may include a combination of enterprise servers such as an application server and a database server. Database 1640 may represent a relational or object database, and may be accessed via a database server.

User computing device 1500 and server 1620 may implement any operating system, such as Windows or UNIX. Client software 1550 and server software 1630 may be written in any programming language, such as ABAP, C, C++, Java or Visual Basic.

In other embodiments, application software embodying the functionality of the present invention may be deployed on a standalone machine or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method for transforming source code of a software application in a plurality of input data formats to a distinct output data format in a markup language, consisting essentially of:

scanning the source code to automatically identify without user intervention the plurality of input data formats in the software application, wherein the source code is of an object oriented programming language;

identifying for each input data format an input transformation program configured to transform a portion of the source code containing the input data format to a standard format;

displaying in an interactive user interface the identified input transformation programs and a list of granularity levels, each granularity level specifying a level of detail of at least one distinct output format;

displaying in the interactive user interface a list of output transformation programs, each output transformation program in the list configured to transform data from the standard format to the distinct output format;

receiving a selection of more than one input transformation program from the displayed identified input transformation programs and at least one granularity level;

receiving a selection of at least one output transformation program from the displayed list of output transformation programs;

utilizing the selected input transformation programs to transform the respective portion of the source code to data in the standard format; and for each selected output transformation program, utilizing the selected output transformation program to further transform the data from the standard format to the distinct output format of the selected output transformation program at the selected granularity level.

2. The method of claim 1, wherein the input data format defines an arrangement of programming class information.

3. The method of claim 2, wherein the programming class information includes class files of an object oriented programming language.

4. The method of claim 2, wherein the programming class information includes local classes of an object oriented programming language.

5. The method of claim 2, wherein the programming class information includes global classes, of an object oriented programming language.

6. The method of claim 1, wherein the input data format defines an arrangement of function module information.

7. The method of claim 6, wherein the function module information includes function pools, of an object oriented programming language.

8. The method of claim 1, wherein the input data format defines an arrangement of application programming interface (API) information.

9. The method of claim 8, wherein the API information includes customer relationship management object information.

10. The method of claim 1, wherein the input data format defines an arrangement of object repository information.

11. The method of claim 10, wherein the object repository information includes customer relationship management object information.

12. The method of claim 1, wherein the input data format defines an arrangement of database table information.

13. The method of claim 1, wherein the standard format is based on a general-purpose modeling language that includes a graphical notation.

14. The method of claim 1, wherein the output data format defines an arrangement of a general-purpose modeling language that includes a graphical notation.

15. The method of claim 14, wherein the output data format is for an integrated development environment.

16. The method of claim 1, wherein the output data format defines an arrangement of HTML documentation information.

17. The method of claim 16, wherein the HTML documentation information includes Javadoc output.

18. The method of claim 16, wherein the HTML documentation information includes ABAPdoc output.

19. The method of claim 1, wherein the output data format is based on a metadata Markup Language.

20. An apparatus for transforming source code of a software application in a plurality of input data formats to a distinct output format in a markup language, consisting essentially of:
a processor; and
a memory, coupled to the processor, storing instructions adapted to be executed by the processor according to the method of:
scanning the source code to automatically identify without user intervention the plurality of input data formats in the software application, wherein the source code is of an object oriented programming language;
identifying for each input data format an input transformation program configured to transform a portion of the source code containing the input data format to a standard format;
displaying in an interactive user interface the identified input transformation programs and a list of granularity levels, each granularity level specifying a level of detail of at least one distinct output format;
displaying in the interactive user interface a list of output transformation programs, each output transformation program in the list configured to transform data from the standard format to the distinct output format;
receiving a selection of more than one input transformation program from the displayed identified input transformation programs;
receiving a selection of at least one output transformation program from the displayed list of output transformation programs and at least one granularity level;
utilizing the selected input transformation programs to transform the respective portion of the source code to data in the standard format; and
for each selected output transformation program, utilizing the selected output transformation program to further transform the data from the standard format to the distinct output format of the selected output transformation program at the selected granularity level.

21. The apparatus of claim 20, wherein the input data format defines an arrangement of programming class information.

22. The apparatus of claim 20, wherein the input data format defines an arrangement of database table information.

23. The apparatus of claim 20, wherein the standard format is based on a general-purpose modeling language that includes a graphical notation.

24. The apparatus of claim 20, wherein the output data format defines an arrangement of a general-purpose modeling language that includes a graphical notation.

25. The apparatus of claim 20, wherein the output data format defines an arrangement of HTML documentation information.

26. The apparatus of claim 20, wherein the output data format is based on a metadata Markup Language.

27. A computer system for transforming source code of a software application in a plurality of input data formats to a distinct output format in a markup language, consisting essentially of:
means for scanning the source code to automatically identify without user intervention the plurality of input data formats in the software application, wherein the source code is of an object oriented programming language;
means for identifying for each input data format an input transformation program configured to transform a portion of the source code containing the input data format to a standard format;
means for displaying in an interactive user interface the identified input transformation programs and a list of granularity levels, each granularity level specifying a level of detail of at least one distinct output format;
means for displaying in the interactive user interface a list of output transformation programs, each output transformation program in the list configured to transform data from the standard format to a distinct output format;
means for receiving a selection of more than one input transformation program from the displayed identified input transformation programs;
means for receiving a selection of at least one output transformation program from the displayed list of output transformation programs and at least one granularity level;
means for utilizing the selected input transformation programs to transform the respective portion of the source code to data in the standard format; and
for each selected output transformation program, means for utilizing the selected output transformation program to further transform the data from the standard format to the distinct output format of the selected output transformation program at the selected granularity level.

28. The system of claim 27, wherein the input data format defines an arrangement of programming class information.

29. The system of claim 27, wherein the input data format defines an arrangement of database table information.

30. The system of claim 27, wherein the standard format is based on a general-purpose modeling language that includes a graphical notation.

31. The system of claim 27, wherein the output data format defines an arrangement of a general-purpose modeling language that includes a graphical notation.

32. The system of claim 27, wherein the output data format defines an arrangement of HTML documentation information.

33. The system of claim 27, wherein the output data format is based on a metadata Markup Language.

34. The method of claim 1, where the selected granularity level suppresses the display of private methods and attributes.

35. The apparatus of claim 20, where the selected granularity level suppresses the display of private methods and attributes.

36. The computer system of claim 27, where the selected granularity level suppresses the display of private methods and attributes.

* * * * *